United States Patent [19]

Higgins et al.

[11] 4,286,003
[45] Aug. 25, 1981

[54] THIN POLYURETHANE FOAM BACKED RUG

[75] Inventors: Kenneth B. Higgins, LaGrange, Ga.; Edgar H. Pittman, Spartanburg, S.C.

[73] Assignee: Milliken Research Corporation, Spartanburg, S.C.

[21] Appl. No.: 99,975

[22] Filed: Dec. 3, 1979

Related U.S. Application Data

[63] Continuation of Ser. No. 952,518, Oct. 18, 1978, abandoned.

[51] Int. Cl.³ .......................... B32B 3/02; B32B 33/00
[52] U.S. Cl. ......................................... 428/95; 428/97; 428/315
[58] Field of Search ...................... 428/95, 96, 97, 315, 428/215

[56] References Cited

U.S. PATENT DOCUMENTS

| | | | |
|---|---|---|---|
| 3,576,706 | 4/1971 | Baumann | 428/95 |
| 3,804,699 | 4/1974 | Johnson | 428/95 |
| 3,926,700 | 12/1975 | Hopkins | 428/95 |

Primary Examiner—Marion McCamish
Attorney, Agent, or Firm—Earle R. Marden; H. William Petry

[57] ABSTRACT

An area rug having an upper loop or pile surface and a secondary backing having a thin, open cell urethane backing adhered thereto to lessen the tendency of the area rug to crawl on the undersurface while maintaining total thickness no greater than 10% greater than the thickness of the primary rug.

3 Claims, 3 Drawing Figures

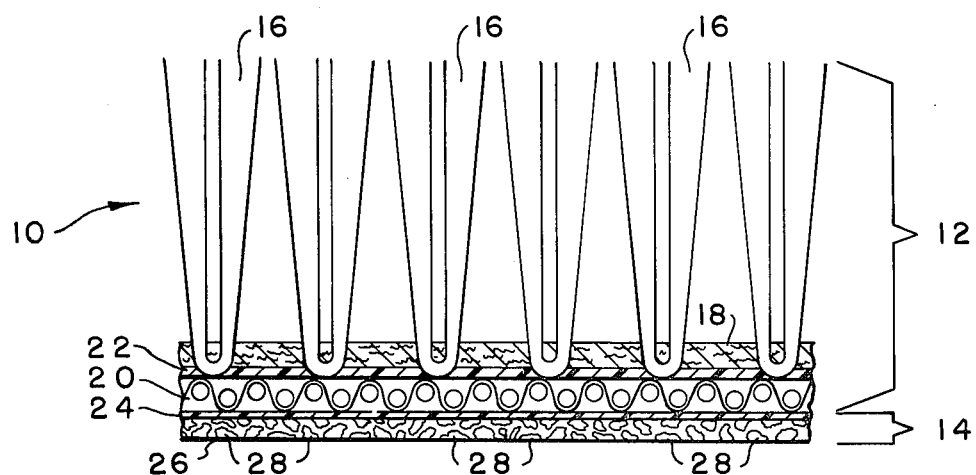
FIG.-1-
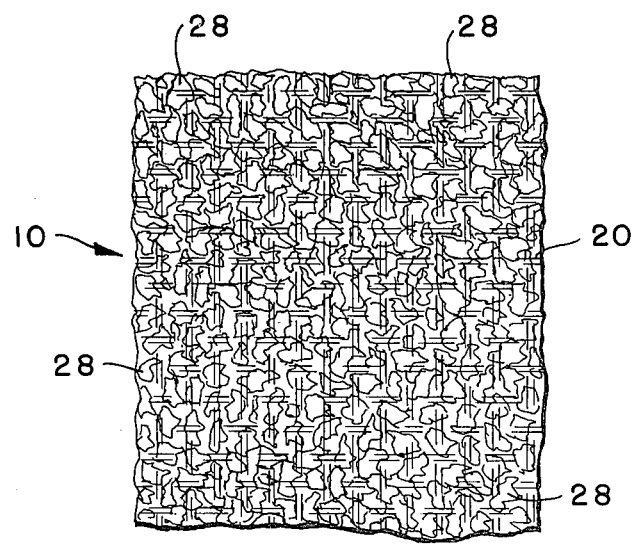
FIG.-2-

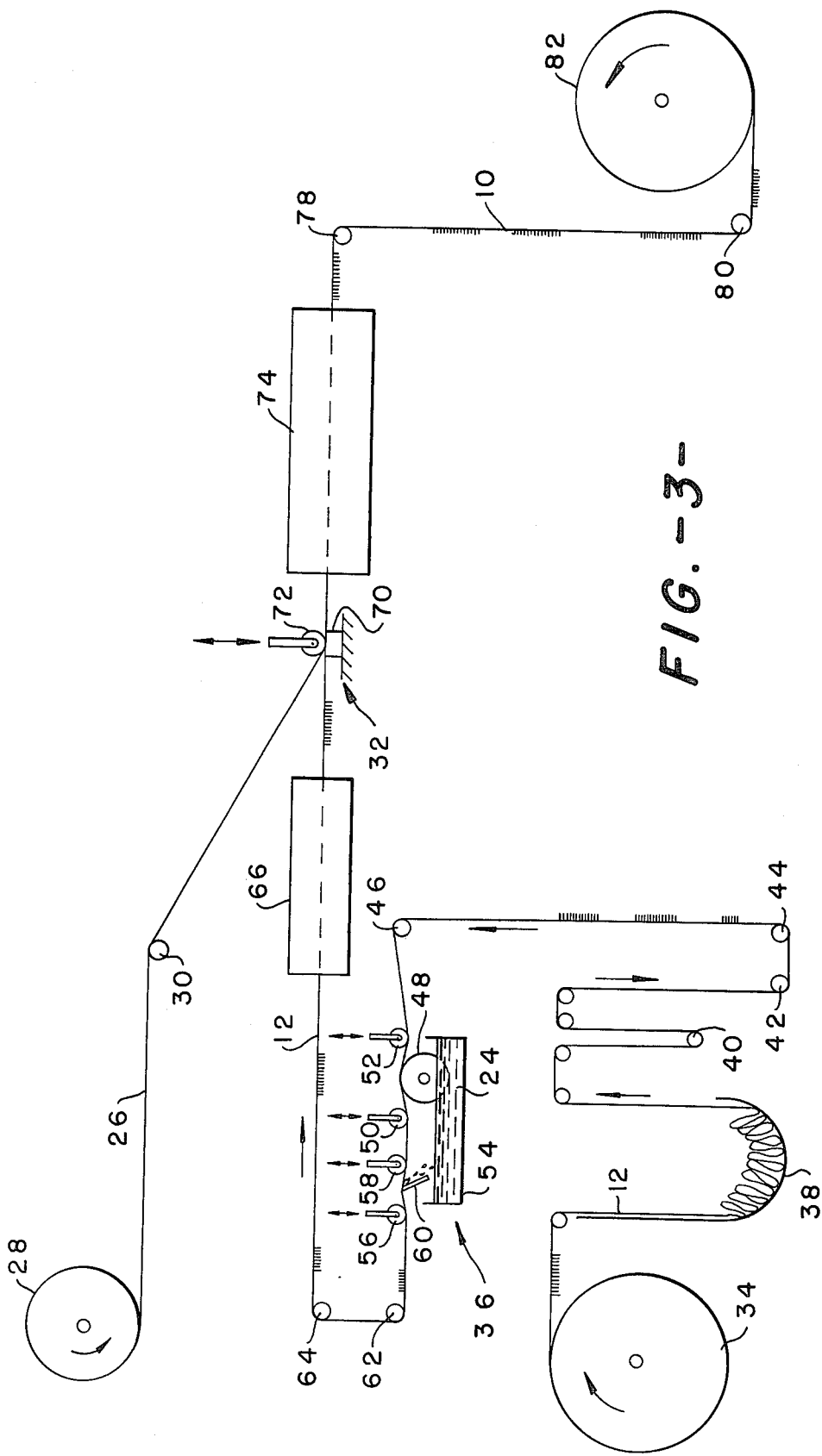
FIG.-3-

THIN POLYURETHANE FOAM BACKED RUG

This is a continuation of application Ser. No. 952,518, filed Oct. 18, 1978, now abandoned.

Area rugs with the standard woven backing tend to skid easily on hard, bare floors and also tend to crawl unidirectional on top of carpet, such as wall-to-wall carpet, when subjected to normal foot traffic. This crawl is due, at least in part, to the ratchet action of the carpet tufts of the under carpet on the rug back of the area rug as they are compressed and released sequentially and to the friction of the carpet tufts against the area rug backing.

Therefore, it is an object of the invention to provide an area rug which not only will not slide on bare floors but also will not crawl when placed on the upper surface of another carpet and will not be greatly thicker than a normal area rug.

Other objects and advantages of the invention will be clearly apparent as the specification proceeds to describe the invention with reference to the accompanying drawings, in which:

FIG. 1 is a cross-sectional, schematic view of the new and improved area rug construction;

FIG. 2 is a bottom view of the area rug shown in FIG. 1; and,

FIG. 3 is a schematic representation of the process of manufacturing the area rug of FIGS. 1 and 2.

In the trade, a rug of a minimum dimension of 3 ft. by 4 ft. up to a maximum of 12 ft.×15 ft. is considered an area rug. In these sizes, the rugs can be readily set into place and/or easily moved to other locations.

The area rug, generally designated by the reference numeral 10, shown in FIGS. 1 and 2, consists basically of a first section 12 and a second section 14. The pile surface 16 of the area rug can be cut pile, as shown, loop pile or a combination of cut and loop pile. In the preferred form of the invention the first section 12 of the area carpet 10 consists of nylon fibers 16 tufted into a non-woven polypropolyene backing fabric 18 which is adhered to a secondary backing of conventional woven polypropolyene 20 by a compounded styrene-butadiene rubber layer 22 well known in the trade or the first section 12 could be woven of conventional carpet yarns.

The first section 12 of the area rug 10 is laminated to the second section 14 by a thin layer of an acrylic polymer 24. The acrylic polymer 24 on one side adheres to and partially encapsulates the woven polypropylene backing material 20 and on the other side adheres to and partially encapsulates a thin layer of slit, open cell polyurethane foam 26.

The open cell polyurethane foam 16 is preferably a polyester, but could be a polyether, so long as it is partially reticulated so when it is slit it is porous and the surface provides a plurality of substantially semi-circular openings 28, which look like little suction cups or interlaced web structure on the surface of the undersurface and act like a soft formable but resilient spider web to prevent the movement encountered by such area rugs.

The preferred adhesive for the lamination of the first section 12 to the second section 14 is an acrylic latex emulsion but other water base emulsion adhesives such as ethylene vinyl acetate adhesive, styrene-butadiene rubber adhesive, nitrile rubber adhesive, natural rubber adhesive, etc., can be used. Also, solvent base adhesive systems containing the adhesive in dissolved form such as solvent based urethane, solvent based acrylics, solvent based styrene-butadiene rubbers, etc., can be used, if desired.

In the preferred form of the invention the slit, open cell urethane foam is a partially reticulated polyester type with 45–70 pores or cells per square inch. The density of the foam is 1.75 I 0.30 lbs/cubic foot and has a tensile strength range of 10–30 lbs. per square inch but preferably is 25 lbs. per square inch.

Surprisingly, we have found that a very thin layer of the urethane foam provides the same desirable non-skid and/or non-crawl qualities as thicker foams do and has a number of added advantages. For example, a thin foam allows improved visual esthetics by allowing the customer to see the underlying rug back thru the foam. Also, a thin foam is more desirable than a thick foam in that it allows the over-all composite rug to be thinner and thereby easier to be walked on and less apt to cause the user to trip. Also, a thinner rug is more desirable in that it will not be as apt to become an obstruction to swinging doors and the like. Furthermore, it is less expensive.

We have found that the minimum thickness for slitting with reasonable control of quality and integrity of the foam, is approximately equal to twice the average diameter of the pores or cells. For example, a foam with 45 pores per inch (PPI) has pores averaging about 0.022 in. diameter and can be cut as thin as about 0.040 in. thick, while a foam with 70 pores per inch can be cut as thin as about 0.020 in. Therefore, the preferred thickness range and PPI range are inter-related and have real value in performance of the resulting composite rug. The thickness versus PPI ratio will vary, of course, depending on many factors such as density, tensil strength, type of cutter, etc.

Regular area rugs are often ¼ to ½ or more inches thick, so the addition of a thin layer of urethane 0.03 inches thick does not add appreciably to the rug's thickness.

Synthetic rubber foam backings have been used as rug and carpet backings but have not been well accepted due to deterioration and lack of stability. The product of this invention is entirely different, not only in composition and physical form, but also in appearance. We provide an area rug with backing which is so thin it does not resemble conventional forms of prior art, but is surprisingly highly effective in stabilizing the rug against pedestrian traffic. It therefore does not suffer from the bad reputation of the older and thicker products.

Looking now to FIG. 3, the manufacture of the area rug 10 shall be explained. The slit, open-cell urethane foam 26 is supplied from a supply roll 28 over an idler roll 30 to the pressure nip device 32 where it is pressed into the acrylic latex adhesive 24 coated onto the first section 12. The first section 12 of the area rug 10 is supplied from a supply roll 34 to coating station 36 via conventional scray 38, tension compensating roll 40 and guide rolls 42, 44 and 46. At the coating station 36, the wrap of the first section 12 on the smooth application roll 48 is controlled by a pair of vertically adjustable rolls 50 and 52 to control the pressure of the section 12 on the application roll 48 as it applies the acrylic emulsion from the container 54 to the bottom of the polypropylene backing 20. A second pair of vertically adjustable rolls 56 and 58 are located downstream of the first pair of rolls 50 and 52 to control the pressure of the coated first section 12 against the knife 60 to control the thickness, penetration and evenness of the acrylic emulsion 24. From the coating station 36 over suitable rolls 62 and 64, the coated first section 12 is directed through the pre-heater 66 to the nip station 32. The pre-heater 66 tackifies the acrylic emulsion so that a good bond is made between the polyester, open-cell urethane 26 at the nip device 32. The nip device 32 consists of a stationary plate 70 and a vertically adjustable roll 72 to control the pressure on the laminated area rug 10. From the nip device 32, the area rug fabric 10 passes into a dryer 74 wherein the bond between the first section 12 and the urethane 26 is set. From the dryer 74 the area rug fabric 10 passes over suitable rolls 78 and 80 to the take-up roll 82. The take-up roll 82 is then delivered for further processing, if necessary, and is finally cut into area rug dimensions.

It can be seen that the above-described process will provide an area rug which has a thin layer of open-cell urethane material bonded thereto which greatly lessens the tendency of the area rug to slip and/or crawl but at the same time has the advantages of not being appreciably thicker than a normal area rug and is relatively inexpensive to produce in an efficient manner.

Although the preferred embodiment has been described in detail, it is contemplated that changes may be made without departing from the scope or spirit of the invention and we desire to be limited only by the claims.

We claim:

1. An area rug comprising: a carpet layer and a thin open-cell polyurethane material bonded to said carpet layer by an adhesive, said open-cell polyurethane material being of from 0.02 inches in thickness to 0.040 inches in thickness with a density of $1.75 \pm 0.30$ pounds per cubic foot, said open-cell polyurethane having 70–45 pores per square inch and when slit having a plurality of substantially semicircular openings in the side thereof away from the pile surface of said carpet layer, said thin open-cell polyurethane material having a thickness of no more than 10% of the thickness of said carpet layer.

2. The area rug of claim 1 wherein said carpet layer is woven.

3. The area rug of claim 1 wherein said carpet layer is a pile fabric having a backing material.

* * * * *